United States Patent
Aoyama

(10) Patent No.: US 6,620,532 B2
(45) Date of Patent: Sep. 16, 2003

(54) MAGNETIC RECORDING MEDIUM AND MAGNETIC WRITE/READ METHOD

(75) Inventor: Tsutomu Aoyama, Tokyo (JP)

(73) Assignee: TDK Corporation, Tokyo (JP)

( * ) Notice: Subject to any disclaimer, the term of this patent is extended or adjusted under 35 U.S.C. 154(b) by 124 days.

(21) Appl. No.: 09/761,717

(22) Filed: Jan. 18, 2001

(65) Prior Publication Data

US 2001/0016271 A1 Aug. 23, 2001

(30) Foreign Application Priority Data

Jan. 21, 2000 (JP) ........................................ 2000-012827

(51) Int. Cl.$^7$ ................................................. G11B 5/66
(52) U.S. Cl. ............................ 428/694 TR; 423/694 T; 423/694 SG; 423/900; 360/135
(58) Field of Search ........................ 428/694 T, 694 TR, 428/694 SG, 900; 360/135

(56) References Cited

U.S. PATENT DOCUMENTS

| | | | |
|---|---|---|---|
| 5,585,138 A | * 12/1996 | Inasaka | ..................... 428/611 |
| 5,698,286 A | 12/1997 | Ikarashi et al. | |
| 5,879,783 A | * 3/1999 | Chang et al. | ................ 428/141 |
| 6,174,537 B1 | * 1/2001 | Khan | ......................... 428/322 |
| 6,331,364 B1 | * 12/2001 | Baglin et al. | ............ 428/694 T |

\* cited by examiner

Primary Examiner—Leszek Kiliman
(74) Attorney, Agent, or Firm—Oblon, Spivak, McClelland, Maier & Neustadt, P.C.

(57) ABSTRACT

A patterned magnetic recording medium has clusters (2) in which minimum magnetic reversal units (21) with an intervening nonmagnetic region (3) are equidistantly arranged in longitudinal and transverse directions to form recording tracks, wherein the clusters (2) are arranged at equal intervals in the recording track longitudinal and transverse directions, the distance between two adjacent minimum magnetic reversal units in the longitudinal direction is $U_L$ within the cluster and $C_L$ between adjacent clusters, satisfying $C_L > U_L$, and the distance between two adjacent minimum magnetic reversal units in the transverse direction is $U_W$ within the cluster and $C_W$ between adjacent clusters, satisfying $C_W > U_W$.

5 Claims, 2 Drawing Sheets

TRANSVERSE DIRECTION

LONGITUDINAL DIRECTION

MAGNETIC RECORDING MEDIUM AND MAGNETIC WRITE/READ METHOD

TECHNICAL FIELD

This invention relates to a magnetic recording medium, typically a magnetic disk, and a writing/reading method therefor.

BACKGROUND ART

Computer magnetic disk units are under rapid development toward a greater capacity. The magnetic disk unit has a magnetic head which produces a signal magnetic field across the magnetic disk to form a row of recording magnetic domains in the recording layer. For increasing the areal recording density of the magnetic disk, it is crucial to miniaturize recording magnetic domains.

In prior art magnetic disks, most magnetic materials of which the recording layer is constructed are Co—Cr—Ta and Co—Cr—Pt systems. The inclusion of an additive element such as Cr, Ta or Pt along grain boundaries weakens the interaction between crystal grains and restrains the generation of a complex magnetic wall structure at the boundary of recorded bits, thereby improving the coercivity and squareness of the recording layer.

However, since the areal recording density of magnetic disk unit is now increasing at an annual rate of about 100%, a continuous improvement in recording density will lead to single recording bits of an extremely small size, at which fringing between adjacent recording bits becomes a problem. The term "fringing" means magnetic bleeding from the perimeter of recording magnetic domains caused by a magnetic field spatially diverging from a magnetic head.

One recording system for solving the problem associated with the increased areal recording density is a patterned medium as disclosed, for example, in JP-B 6-28039. The patterned medium has a structure that a recording layer is divided in a mesh pattern to isolate islands of magnetic material. The space between adjacent islands of magnetic material is filled with a nonmagnetic material.

The patterned medium allows the bit density and track density to be increased. However, as the track density increases, the alignment of the head becomes difficult. The patterned medium is difficult to control the write timing since a recording magnetic field must be applied in accordance with the position of minute magnetic material islands constituting minimum magnetic reversal units.

SUMMARY OF THE INVENTION

An object of the invention is to provide a patterned medium comprising recording tracks having minimum magnetic reversal units arranged with a nonmagnetic region intervening therebetween, which facilitates the alignment of a head and the control of write timing.

According to the invention, there is provided a magnetic recording medium in which minimum magnetic reversal units with a nonmagnetic region intervening therebetween are arranged in a two-dimensional pattern to form substantially parallel recording tracks. A plurality of minimum magnetic reversal units are arranged at equal intervals in longitudinal and transverse directions of the recording tracks to construct a cluster. The clusters are arranged at equal intervals in the longitudinal and transverse directions of the recording tracks. Each cluster has the same number of minimum magnetic reversal units arranged in the recording track longitudinal direction and the same number of minimum magnetic reversal units arranged in the recording track transverse direction. The center-to-center distance between two adjacent minimum magnetic reversal units in the recording track longitudinal direction is $U_L$ within the cluster and $C_L$ between adjacent clusters, satisfying $C_L/U_L>1$. The center-to-center distance between two adjacent minimum magnetic reversal units in the recording track transverse direction is $U_W$ within the cluster and $C_W$ between adjacent clusters, satisfying $C_W/U_W>1$.

In one preferred embodiment, the minimum magnetic reversal units are constructed of a perpendicular magnetizable recording material.

In another aspect, the invention provides a method for writing and reading signals of information in and from the magnetic recording medium defined above, comprising the steps of simultaneously writing signals of information in the minimum magnetic reversal units arranged in the recording track transverse direction within one cluster, and simultaneously reading the signals in the units.

Preferably, a write/read head comprising write elements and read elements is used, the number of write elements is equal to the number $C_N$ of minimum magnetic reversal units arranged in the recording track transverse direction within one cluster, and the number of read elements is greater than $C_N$. Also preferably, a write/read head comprising write elements and read elements which are spaced apart in the recording track longitudinal direction is used, the timing to start writing in a cluster in which signals are to be written is controlled on the basis of the leading or trailing end of another cluster detected by the read elements.

DESCRIPTION OF THE PREFERRED EMBODIMENTS

Figure 1:
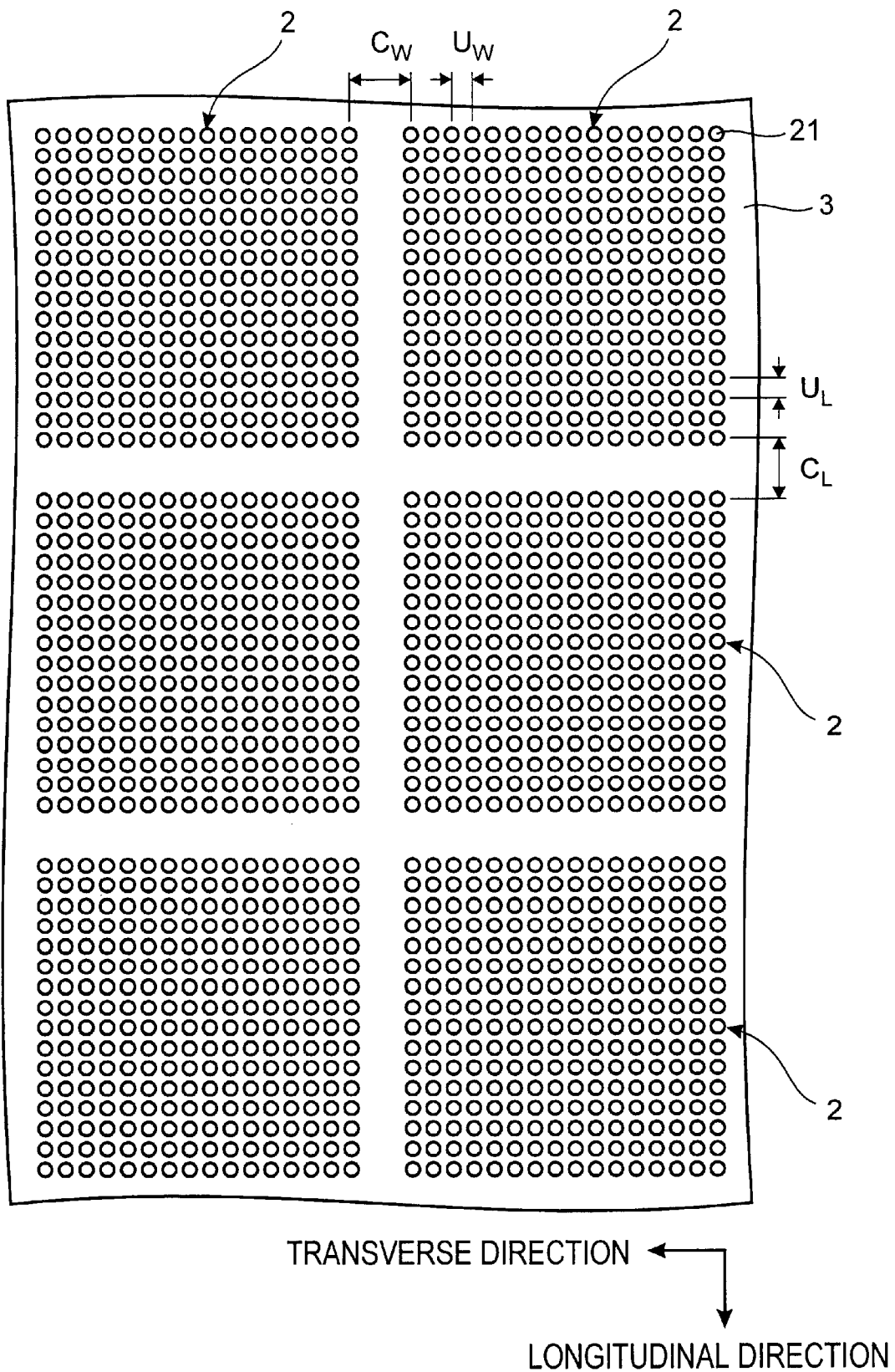
FIG. 1 is a plan view of a magnetic recording medium according to one embodiment of the invention.

Referring to FIG. 1, there is illustrated a magnetic recording medium according to one embodiment of the invention. The recording surface is shown in the plan view of FIG. 1.

The magnetic recording medium is a patterned medium in which minimum magnetic reversal units 21 with a nonmagnetic region 3 intervening therebetween are arranged in a two-dimensional matrix. The minimum magnetic reversal units 21 are arranged in vertical or longitudinal rows to construct recording tracks. In the figure, thirty two (32) recording tracks are substantially parallel to each other.

The medium includes clusters 2 each consisting of sixteen (16) minimum magnetic reversal units 21 arranged at equal intervals in a longitudinal direction (upper-lower direction in the figure) of the recording tracks, and sixteen (16) minimum magnetic reversal units 21 arranged at equal intervals in a transverse direction (left-right direction in the figure) of the recording tracks, totaling to 256 units. In the figure, there are illustrated six clusters 2. The clusters 2 are arranged at equal intervals in the longitudinal and transverse directions of the recording tracks. According to the invention, the spacing between minimum magnetic reversal units 21 is increased at specific intervals (every selected number of units) in both the longitudinal and transverse directions of the recording tracks to define the clusters. That is, the distance between adjacent clusters 2 is greater than the distance between minimum magnetic reversal units 21 within the cluster. More specifically, the center-to-center distance between two adjacent minimum magnetic reversal units in the recording track longitudinal direction is $U_L$ within the cluster and $C_L$ between adjacent clusters, satisfying $C_L>U_L$, and the center-to-center distance between two adjacent minimum magnetic reversal units in the recording track transverse direction is $U_W$ within the cluster and $C_W$ between adjacent clusters, satisfying $C_W>U_W$. Neither $C_L=C_W$ nor $U_L=U_W$ is necessary although $C_L=C_W$ and/or $U_L=U_W$ is acceptable.

Among all the clusters 2, the number of minimum magnetic reversal units 21 arranged in the recording track longitudinal direction (also referred to as cluster longitudinal direction) is the same, and the number of minimum magnetic reversal units 21 arranged in the recording track transverse direction (also referred to as cluster transverse direction) is the same. In the illustrated embodiment, the number of units is equal in both the directions, but need not be equal in both the directions.

In writing and reading signals of information in and from the magnetic recording medium of the invention, signals of information are simultaneously written in minimum magnetic reversal units arranged in the recording track transverse direction within one cluster, and the signals are simultaneously read from these units. The transfer rate is then significantly increased.

The write/read method uses a write/read head which preferably includes an array of a plurality of write elements arranged in the recording track transverse direction and an array of a plurality of read elements arranged in the recording track transverse direction. The write element array and the read element array are spaced apart in the recording track longitudinal direction. Preferably the write elements are of the induction type and the read elements are of the magnetoresistance (MR) effect type.

The number of elements in each of the write and read element arrays may be equal to the number $C_N$ of minimum magnetic reversal units arranged in the recording track transverse direction within one cluster. Since relatively wide nonmagnetic regions intervene between adjacent clusters 2 according to the invention, the write/read head can be positioned or aligned by utilizing the nonmagnetic regions. In order to more readily control the alignment of the write/read head, the read element array preferably includes a control-dedicated read element. The control-dedicated read element is located at the end of the array and its number is at least 1, especially equal to 2. The position of the write/read head is controlled such that the control-dedicated read element at the end of the read element array is located above the wide nonmagnetic region between the clusters, that is, the read output of the control-dedicated read element may become minimal. With the control-dedicated read elements located at opposite ends of the array, the shift direction of the head position can be detected, ensuring easy and rapid head alignment control. Although the alignment of the head generally becomes difficult with an increasing density of recording tracks, the alignment of the write/read head can be easily effected by utilizing the wide nonmagnetic region between clusters as mentioned above, and preferably by setting the number of read elements greater than $C_N$.

The patterned medium is difficult to control the write timing since a recording magnetic field must be applied in accordance with the position of a minute magnetic material spot constituting the minimum magnetic reversal unit. In contrast, the invention enables strict control of write timing by using a write/read head having a write element array and a read element array spaced apart in the recording track longitudinal direction, so that the timing to start writing in a cluster in which signals are to be written (referred to as objective cluster) is controlled on the basis of the leading or trailing end of another cluster detected by the read elements. The wide nonmagnetic region between clusters in the recording track longitudinal direction is effectively utilized to this end.

Figure 2:
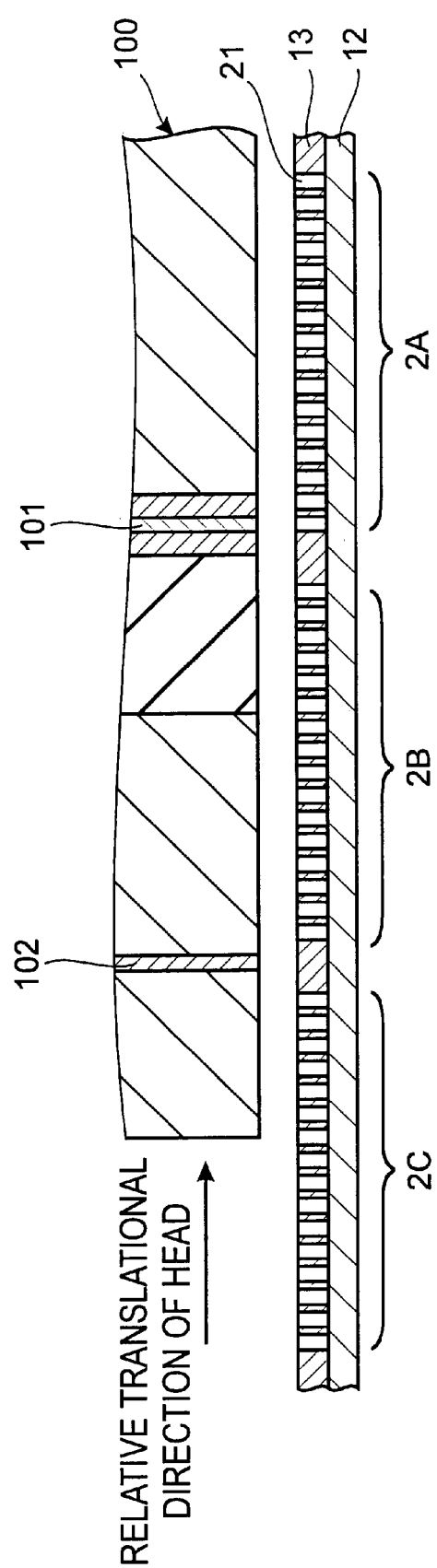
FIG. 2 schematically illustrates a write/read head relative to the magnetic recording medium of the invention.

Referring to FIG. 2, the positional relation of the write/read head to the magnetic recording medium is schematically illustrated in cross section. The write/read head 100 includes an MR sensor 101 as the read element and a main magnetic pole 102 as the write element. The magnetic recording medium includes a nonmagnetic substrate (not shown), a soft magnetic undercoat layer 12 and a nonmagnetic layer 13 disposed on the substrate in this order. The nonmagnetic layer 13 has a plurality of minimum magnetic reversal units 21 embedded therein and grouped as clusters 2A, 2B and 2C. In each cluster, the number of minimum magnetic reversal units 21 arranged in the movement direction of the head relative to the medium is sixteen (16). This magnetic recording medium is a perpendicular magnetic recording medium in which the soft magnetic undercoat layer 12 is made of a high permeability soft magnetic material such as Ni—Fe alloy and the minimum magnetic reversal units 21 are made of a perpendicular magnetizable recording material such as Co—Cr alloy.

In the write/read head illustrated herein, the distance between the read and write elements 101 and 102 is slightly greater than the length of one cluster 2. As a consequence, the point of time in the figure, that is, the time when the MR sensor 101 has detected the leading end of a cluster 2A becomes a point of reference, and write operation is started after a predetermined delay time from this point of reference. Then write operation is started when the main magnetic pole 102 reaches just above the minimum magnetic reversal unit constituting the leading end of a cluster 2B.

In the illustrated embodiment, the cluster disposed adjacent to the objective cluster (in which signals are to be written) is utilized for control purposes, although the invention is not limited thereto. One or more clusters may intervene between the objective cluster and the controlling cluster. However, if the controlling cluster is too much spaced apart from the objective cluster, there is a likelihood that the timing control becomes inaccurate due to accumulated errors of the cluster length. In the application of the invention to a magnetic disk, if the write element is spaced far apart from the read element, it becomes difficult to place the write element array and the read element array parallel, that is, the manufacture of the head becomes difficult. For this and other reasons, the distance between write and read elements is preferably set such that the number of clusters located within this distance is less than 100.

As previously described, the invention requires both the inequalities:

$$C_L/U_L>1 \text{ and } C_W/U_W>1.$$

For easy and accurate alignment of the write/read head and control of write timing, it is desirable to satisfy one, especially both of the inequalities:

$$C_L/U_L \geq 2 \text{ and } C_W/U_W \geq 2;$$

and more desirable to satisfy one, and especially both of the inequalities:

$C_L/U_L \geq 3$ and $C_W/U_W \geq 3$.

However, if one or both of $C_L/U_L$ and $C_W/U_W$ are too large, the recording density becomes low. It is then desirable to satisfy one, especially both of the inequalities:

$C_L/U_L \leq 10$ and $C_W/U_W \leq 10$;

and more desirable to satisfy one, and especially both of the inequalities:

$C_L/U_L \leq 4$ and $C_W/U_W \leq 4$.

The number of minimum magnetic reversal units arranged in the recording track longitudinal and transverse directions within one cluster is not critical although the number of units arranged in either direction is preferably an involution of 2 (i.e., $2^n$) for easy processing during write and read operations. Since too small a number of units may fail to increase the recording density, the preferred number is at least 4, and more preferably at least 8. Too large a number of units may give rise to the following problem. The number of read elements in the head must be equal to or greater than the number of minimum magnetic reversal units arranged in the cluster transverse direction, but a head with a greater number of read elements is difficult to manufacture. Also when the invention is applied to a magnetic disk, and the head is aligned using a rotary arm, the skew angle differs between the inner and outer peripheries of the disk. Then, if a large number of units are arranged in the cluster transverse direction, it becomes necessary to change the minimum magnetic reversal unit spacing between the inner and outer peripheries of the disk, resulting in a complex medium design. On the other hand, if a large number of minimum magnetic reversal units are arranged in the cluster longitudinal direction, the write timing preset on the basis of the cluster leading end can be shifted by disk wow and flutter or other causes. For such reasons, the number of units arranged in the cluster transverse direction is preferably up to 128, more preferably up to 64, and the number of units arranged in the cluster longitudinal direction is preferably up to 256, more preferably up to 128.

According to the invention, the write/read operations and control thereof are carried out using the clusters as basic units so that the center-to-center distance between minimum magnetic reversal units within a cluster can be reduced from that in the prior art. Specifically, the center-to-center distance can be about 10 to 300 nm, especially about 10 to 50 nm.

Since the invention permits minimum magnetic reversal units to be arranged in a very high density, the minimum magnetic reversal units are advantageously made of a perpendicular magnetizable recording material capable of high density recording.

Understandably, the invention is generally applicable to magnetic disks. While the recording tracks in the magnetic disk are circular, the clusters may generally be of rectangular shape because they are extremely small as compared with the disk size.

The magnetic recording medium of the invention does not require that the spacing between minimum magnetic reversal units be equal in all clusters. For example, when the invention is applied to a magnetic disk, and the head is aligned using a rotary arm, it is sometimes necessary to change the minimum magnetic reversal unit spacing between those clusters near the inner periphery and those clusters near the outer periphery of the disk, as previously mentioned. In such a case, $C_L/U_L$ and $C_W/U_W$ may be independently set at the outer and inner peripheries.

Except for the essential and optional features described above, the remaining parameters of the invention are not critical and may comply with the conventional patterned medium. The magnetic recording medium can be prepared by the same method as the conventional patterned medium. For example, a method for preparing a patterned medium using a perpendicular magnetizable recording material is described in J. Appl. Phys., 81(8), 15, 4730–4732, April 1997.

There has been described a patterned medium in which the recording surface is divided into a plurality of clusters so that the position of the head in the longitudinal and transverse directions of recording tracks can be readily detected, ensuring the ease of high density writing and reading operation. The transfer rate is dramatically increased by simultaneously carrying out write and read operations on a series of minimum magnetic reversal units arranged in the transverse direction of clusters.

Japanese Patent Application No. 2000-012827 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A magnetic recording medium in which minimum magnetic reversal units with a nonmagnetic region intervening therebetween are arranged in a two-dimensional pattern to form substantially parallel recording tracks,
   a plurality of minimum magnetic reversal units are arranged at equal intervals in longitudinal and transverse directions of the recording tracks to construct a cluster,
   the clusters are arranged at equal intervals in the longitudinal and transverse directions of the recording tracks,
   each cluster has the same number of minimum magnetic reversal units arranged in the recording track longitudinal direction and the same number of minimum magnetic reversal units arranged in the recording track transverse direction,
   the center-to-center distance between two adjacent minimum magnetic reversal units in the recording track longitudinal direction is $U_L$ within the cluster and $C_L$ between adjacent clusters, satisfying $C_L/U_L>1$, and
   the center-to-center distance between two adjacent minimum magnetic reversal units in the recording track transverse direction is $U_W$ within the cluster and $C_W$ between adjacent clusters, satisfying $C_W/U_W>1$.

2. The magnetic recording medium of claim 1 wherein said minimum magnetic reversal units are constructed of a perpendicular magnetizable recording material.

3. A method for writing and reading signals of information in and from the magnetic recording medium of claim 1, comprising
   simultaneously writing signals of information in the minimum magnetic reversal units arranged in the recording track transverse direction within one cluster, and simultaneously reading the signals in said units.

4. The method of claim 3 using a write/read head comprising write elements and read elements, wherein the number of write elements is equal to the number $C_N$ of minimum magnetic reversal units arranged in the recording track transverse direction within one cluster, and the number of read elements is greater than $C_N$.

5. The method of claim 3 using a write/read head comprising write elements and read elements which are spaced apart in the recording track longitudinal direction, wherein the timing to start writing in a cluster in which signals are to be written is controlled on the basis of the leading or trailing end of another cluster detected by the read elements.

* * * * *